Patented Jan. 22, 1935

1,988,448

UNITED STATES PATENT OFFICE 1,988,448

PRODUCTION OF CONVERSION PRODUCTS OF RUBBER

Heinrich Hopff, Friedrich Ebel, and Emerich Valkó, Ludwigshafen-on-the-Rhine, Germany, assignors to I. G. Farbenindustrie Aktiengesellschaft, Frankfort-on-the-Main, Germany No Drawing. Application November 19, 1931, Serial No. 576,212. In Germany December 2, 1930

12 Claims. (Cl. 260—1)

The present invention relates to the production of conversion products of rubber.

It is already known that by acting on solutions of rubber with benzoic per-acid a white conversion product containing oxygen can be obtained which is unsuitable for the most important industrial purposes by reason of its insolubility in most organic solvents.

We have now found that conversion products of rubber which are valuable industrially are obtained by treating a rubber material with aliphatic per-acids at a temperature of from —20° to 45° C. Pure white, from powdery to fibrous substances, which, when the action of the per-acids has been continued for a sufficiently long period of time, are from soluble to capable of swelling in all the usual organic solvents, such as aliphatic, aromatic, cycloaliphatic and hydroaromatic hydrocarbons and halogen derivatives thereof, for example in ligroine, benzene, toluene, xylene, mono-, di- and tri-chlorobenzene, tetrahydronaphthalene, chloroform and carbon tetrachloride, in liquid aliphatic alcohols, such as methanol and ethanol, in ketones such as acetone and cyclohexanone, and in glacial acetic acid, but which are insoluble in ethyl ether and water, are obtained while avoiding practically completely any degradation of the rubber molecule. The solutions obtained are highly viscous; the products become plastic when heated and are capable of being heated without decomposition to elevated temperatures, say up to about 170° C., and of being moulded into shaped articles by pressure-moulding. According to analysis it is probable that the conversion products contain alcoholic hydroxyl groups which are partly acylated by the acids corresponding to the per-acids employed. The acyl radicals may be removed by saponification with the aid of alkali or acid, the corresponding polyhydric substances thus being obtained.

The term "rubber material" is meant not only to include the various types of India rubber encountered in commerce, such as Para rubber, crepe rubber, smoked sheets and the like, but also includes natural or synthetic rubber-like materials, such as balata, gutta percha and the rubber-like polymerization products obtained by the polymerization of dienes, as for example butadiene.

Suitable aliphatic- per-acids are in particular those which contain up to 4 carbon atoms, for example performic acid, per-acetic acid, per-propionic acid and the mono- and di-chloro- and -bromo- per-acetic and per-propionic acids. From 20 to 400 per cent, usually from 100 to 200 per cent, by weight, of the rubber material, of per-carboxylic acids may be employed, i. e., generally, 1 molecular proportion of the per-carboxylic acid will be employed per each double linkage of the rubber material, but a larger amount of per-carboxylic acids may also be used in order to accelerate the reaction, and less than 1 molecular proportion will be used when incompletely converted products are to be prepared. Instead of the per-acids, mixtures which behave as per-acids may be employed with the same result. Thus for example instead of the per-acids a mixture of an aliphatic carboxylic acid and a water-soluble per-compound may be employed; thus, instead of per-acetic acid, a mixture of acetic anhydride and hydrogen peroxide, or a mixture of acetic acid and inorganic per-compounds, such as per-sulphuric acid, per-phosphoric acid and the like may be employed, it not being essential to employ anhydrous reagents. Thus for example hydrogen peroxide of 30 per cent strength may be employed in admixture with aliphatic acids containing water, if desired in the presence of an agent assisting esterification such as sulphuric acid, phosphoric acid or sodium fluoride.

The rubber material may be treated with the per-acids as such or in solution in inert organic solvents such as liquid hydrocarbons and halogen derivatives thereof, for example in chloroform, carbon tetrachloride, benzene, toluene, xylene, monochlorobenzene, dichlorobenzene, trichlorobenzene and trichlorethane or in aqueous suspension. Since the conversion takes place even at —20° C., it is usually sufficient to allow the reaction mixture to stand for some time at room temperature. The duration of the reaction is shortened, however, by employing moderately elevated temperatures as for example up to 45° C., degraded, commercially valueless products being obtained at 50° C., or higher temperatures owing to a degradation of the rubber. If solid rubber be employed by treating small particles thereof for example with a solution of per-acetic acid in glacial acetic acid, the reaction may be stopped after the rubber is strongly swollen or after it has been dissolved.

The conversion products resulting from the treatment in solution or suspension differ from the initial materials by the fact that they are considerably more soluble in, or capable of being swollen by, organic solvents, such as ethyl alcohol or acetone and yield solutions having generally a lower viscosity than those of rubber which solutions may be employed as coating compositions or for the preparation of films, by spraying or pouring, of artificial threads by dry or wet spinning methods and like processes for the production of artificial masses. They may be used alone or adulterated with other usual film-forming constituents of varnishes or lacquers, as for example resins, cellulose carboxylates such as acetyl cellulose, or cellulose ethers or nitrocellulose, for the preparation of coatings or impregnations, which are distinguished by good fastness to water and a good lustre, and as adhesives in the production of emery paper or tape and like abrasive materials.

All the conversion products including those prepared by a swelling treatment become plastic when heated and may be employed as substitutes for celluloid, gutta percha, shellac and for the preparation of masses resembling linoleum and artificial leather and may be shaped by pressing, blowing or injection-moulding. Solid articles obtained may be worked by polishing, grinding, turning, drilling and butting or shaping. By reason of their extremely low electrical conductivity they are also suitable for insulating purposes for example in the place of gutta percha. The plasticity and hardness of the conversion products may be adjusted for any purpose by the addition of softening agents, such as aryl phosphates, or phthalic esters, inorganic and organic fillers, as for example barium sulphate, asbestos or cork meal, natural and artificial resins, such as copals or artificial resins prepared from styrene, or several of these agents.

The polyhydric compounds obtained from the conversion products by saponification of acylated hydroxyl groups may be employed for the preparation of further conversion products of rubber, as for example by condensation with an aldehyde, whereby harder products are obtained which are insoluble.

The following examples will further illustrate the nature of this invention, but the invention is not restricted to these examples. The parts are by weight.

Example 1

100 parts of India rubber are dissolved in 1500 parts of chloroform and mixed with the per-acetic acid solution prepared from 120 parts of a 30 per cent aqueous hydrogen peroxide solution and 540 parts of acetic anhydride with the aid of 6 parts of sulphuric acid. After shaking for two days at room temperature, e. g. at about 15° C., the resulting colourless, comparatively viscous solution is washed free from acid with water. After treatment with steam, a pale yellow, tough but elastic product remains behind which contains about 18 per cent of oxygen. When the reaction is carried out at 45° C., it is completed after about 8 hours, but the pulverulent product cannot be employed for pressing or injection-moulding artificial articles.

Example 2

100 parts of India rubber dissolved in 1500 parts of chloroform are treated as described in Example 1 with 800 parts of a 15 per cent solution or per-acetic acid in glacial acetic acid (prepared for example from boro-acetic anhydride according to "Berichte der Deutsch. Chem. Gesellschaft", 1912, volume 45, page 1845). 150 parts of a white, light powder containing from 22 to 23 per cent of oxygen are obtained. The said product first becomes plastic in boiling water.

Example 3

100 parts of finely cut raw India rubber (crepe) are introduced into 1850 parts of a 10 per cent solution of per-acetic acid in glacial acetic acid. The temperature is prevented from rising above 30° C., by cooling. After 48 hours the rubber has dissolved. The solution, if necessary after filtration, is then poured into from 5 to 10 times the amount of water, whereby an emulsion is formed which is caused to flocculate by the addition of electrolytes (as for example ammonium nitrate) or other coagulating agents such as sodium acetate. After filtration and washing, the precipitate is dried. About 140 to 150 parts of a snow-white, very fine and loose powder are obtained containing from 20 to 23 per cent of oxygen. It is soluble in methanol, ethanol, acetone, ethyl acetate, chloroform, benzene, toluene and chlorbenzene, but is insoluble in water and ethyl ether. It becomes plastic in hot water.

Example 4

100 parts of crepe rubber in the form of shavings are introduced into 800 parts of a 15 per cent solution of per-acetic acid in glacial acetic acid as described in Example 2. By allowing the whole to stand for from 24 to 48 hours at 0° C., while stirring the rubber is swollen. The swollen product is then freed from the solution by pressing and freed from acid by washing with water until the pieces of hard product do not contain any acid. The product is then dried and can be directly pressure-moulded at 110° C., whereby translucent pale artificial masses are obtained.

Example 5

100 parts of rubber, dissolved in 1500 parts of choloroform, are stirred at 5° C., with 900 parts of a 15 per cent solution of per-propionic acid in propionic acid until a comparatively viscous solution is formed. After working up as described in Example 1 a product having properties similar to those of the product obtained according to Example 2 is obtained.

Example 6

100 parts of purified gutta percha are treated in the manner described in Example 3. The resulting product is colourless and soluble in ethanol, acetone, ethyl or butyl acetates, chloroform, benzene and chlorbenzene. It differs from the product obtained according to Example 3 mainly by its higher softening point.

Example 7

100 parts of a solid, rubber-like polymerization product of butadiene which cannot be distilled without decomposition are treated in the manner described in Example 3. 140 parts of a white pulverulent substance containing 20 per cent of oxygen are obtained. It is soluble in acetone, methanol, ethyl or butyl acetates, and chloroform or chlorbenzene and softens at about 80° C.

Example 8

100 parts of "sprayed" rubber, obtained by spraying rubber latex in a current of hot air, are introduced into 2100 parts of a 10 per cent solution of per-acetic acid in glacial acetic acid, the temperature being below 10° C. by external cooling. After from 2 to 3 hours the rubber is dissolved and the whole is worked up as described in Example 3, whereby a flocculent material insoluble in lower aliphatic alcohols and in acetone is obtained which may be employed for pressure- or injection-moulding and furnishes moulded articles of high quality.

Example 9

50 parts of water and 500 parts of ethyl alcohol containing 5 parts of caustic potash are added to 100 parts of the product obtained according to Example 1, which is swollen in 500 parts of ethyl alcohol. The mixture is boiled under reflux for about 3 to 4 hours.

The saponified product obtained has the same physical properties as the initial product, its oxygen content is higher and it is more readily hardened when treated for example with formaldehyde.

What we claim is:—

1. The process for the production of conversion products of rubber which comprises acting on a rubber material with an aliphatic per-carboxylic acid at a temperature of from —20° to 45° C.

2. The process for the production of conversion products of rubber which comprises acting on a rubber material with an aliphatic per-carboxylic acid containing up to 4 carbon atoms at a temperature of from —20° to 45° C.

3. The process for the production of conversion products of rubber which comprises acting on a rubber material with an aliphatic per-carboxylic acid at a temperature of from —20° to 45° C. in the presence of an inert, organic rubber solvent.

4. The process for the production of conversion products of rubber which comprises acting on a rubber material with from 20 to 200 per cent of its weight of an aliphatic per-carboxylic acid at a temperature of from —20° to 45° C.

5. The process for the production of conversion products of rubber which comprises acting on a rubber material with a mixture of an aliphatic carboxylic acid and a water-soluble peroxide compound at a temperature of from —20° to 45° C.

6. The process for the production of conversion products of rubber which comprises acting on a rubber material with a mixture of hydrogen peroxide and an aqueous aliphatic carboxylic acid at a temperature of from —20° to 45° C.

7. The process for the production of conversion products of rubber which comprises acting on a rubber material at a temperature of from —20° to 45° C. with a mixture of hydrogen peroxide, an aqueous aliphatic carboxylic acid and an agent capable of assisting esterifications.

8. The process for the production of conversion products of rubber which comprises acting on a rubber material with per-acetic acid at a temperature of from —20° to 45° C.

9. The process for the production of conversion products of rubber which comprises acting on a rubber material with per-acetic acid in the presence of an inert, organic rubber solvent and at a temperature of from —20° to 45° C.

10. The process for the production of conversion products of rubber which comprises acting on India rubber with per-acetic acid at a temperature between 0° and 30° C.

11. A pure white conversion product of rubber which has a physical nature ranging from powdery to fibrous, is insoluble in ethyl ether and water, is soluble or capable of swelling in liquid aliphatic alcohols, yields highly viscous solutions in the usual organic solvents, becomes plastic when heated, is capable of being heated up to about 170° C. without decomposition, is capable of being molded into shaped articles by pressure molding, and is substantially identical to a product obtained by the process defined in claim 1.

12. A pure white powdery conversion product of rubber which is composed of carbon, hydrogen and from 20 to 23 per cent of oxygen, is insoluble in ethyl ether and water, is soluble or capable of swelling in liquid aliphatic alcohols, becomes plastic when heated and is substantially identical to a product obtained by the process defined in claim 10.

HEINRICH HOPFF.
FRIEDRICH EBEL.
EMERICH VALKÓ.